US008831869B2

(12) United States Patent
Bai et al.

(10) Patent No.: US 8,831,869 B2
(45) Date of Patent: Sep. 9, 2014

(54) USING V2X-BASED IN-NETWORK MESSAGE GENERATION, AGGREGATION, DISTRIBUTION AND PROCESSING PROTOCOLS TO ENABLE ROAD HAZARD CONDITION WARNING APPLICATIONS

(75) Inventors: Fan Bai, Ann Arbor, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1111 days.

(21) Appl. No.: 12/415,792

(22) Filed: Mar. 31, 2009

(65) Prior Publication Data

US 2010/0250106 A1 Sep. 30, 2010

(51) Int. Cl.
*G06F 17/10* (2006.01)
*G08G 1/16* (2006.01)
*G08G 1/0967* (2006.01)

(52) U.S. Cl.
CPC .......... *G08G 1/161* (2013.01); *G08G 1/096716* (2013.01); *G08G 1/096758* (2013.01); *G08G 1/096791* (2013.01)
USPC ........... 701/301; 701/117; 701/423; 701/472; 701/517

(58) Field of Classification Search
CPC ...... G08G 1/161; H04W 84/18; H04L 67/104
USPC .......................... 701/301, 117, 423, 472, 517
See application file for complete search history.

(56) References Cited

U.S. PATENT DOCUMENTS

2002/0019697 A1* 2/2002 Cong et al. .................... 701/207
2007/0087756 A1 4/2007 Hoffberg
2008/0002635 A1* 1/2008 Mosko et al. ................. 370/338
2008/0030370 A1* 2/2008 Doyle ........................... 340/905
2010/0076670 A1* 3/2010 Turner et al. .................. 701/117

FOREIGN PATENT DOCUMENTS

DE 10 2006 004 130 A1 8/2007

OTHER PUBLICATIONS

Lochert et al., Probabilities Aggregation for Data Dissemination in VANETs, Sep. 2007, ACM, VANET '07 Proceedings of the Fourth ACM International Workshop on Vehicular Ad Hoc Networks, p. 1-8.*

* cited by examiner

*Primary Examiner* — Joy Chng
(74) *Attorney, Agent, or Firm* — John A. Miller; Miller IP Group, PLC

(57) ABSTRACT

A method for providing messages indicating potential hazardous road conditions using a wireless communications network. Vehicles using the network include sensors that are able to detect various potentially hazardous road conditions, such as rain, fog, icy road conditions, traffic congestion, etc. A plurality of vehicles that detect a specific road condition provide a confidence value that the condition exists. The confidence value is then aggregated by the vehicles with the confidence value of the detected condition from the other vehicles to provide an aggregated result that identifies the probability that the detected road condition is occurring. The aggregated result is then transmitted to other vehicles approaching the road condition, possibly in a multi-hop manner. Alternately, the confidence value from all of the vehicles that detect the condition can be transmitted to approaching vehicles who will provide the aggregated result identifying the potential that the condition exists.

20 Claims, 2 Drawing Sheets

USING V2X-BASED IN-NETWORK MESSAGE GENERATION, AGGREGATION, DISTRIBUTION AND PROCESSING PROTOCOLS TO ENABLE ROAD HAZARD CONDITION WARNING APPLICATIONS

BACKGROUND OF THE INVENTION

1. Field of the Invention

This invention relates generally to a system and method for warning vehicle drivers of potential hazardous road conditions and, more particularly, to a system and method for warning vehicle drivers of potential hazardous road conditions that uses a vehicle-to-vehicle communications system and in-vehicle sensors, where the sensors detect the hazardous road conditions and the probability of the detected condition from a vehicle is aggregated with the probability of the detected condition from other vehicles to provide a distributed aggregation operator that is transmitted to vehicles approaching the road condition.

2. Discussion of the Related Art

Traffic accidents and roadway congestion are significant problems for vehicle travel. Providing continuous traffic information to a vehicle driver is available in today's vehicles through, for example, XM radio or wireless Internet. One of the challenges in current traffic information systems is that the information is not in real-time, which means that there may be a considerable delay between collecting the traffic information and presenting it to a particular vehicle driver where sometimes the information may be outdated or misleading.

Vehicular ad-hoc network based active safety and driver assistance systems allow a wireless vehicle communications system to transmit messages to other vehicles in a particular area with warning messages about driving conditions. In these systems, multi-hop geocast routing protocols, known to those skilled in the art, are commonly used to extend the reachability of the warning messages, i.e., to deliver active messages to vehicles that may be a few kilometers away, as a one-time multi-hop transmission process. In other words, an initial message advising drivers of a certain situation is transferred from vehicle to vehicle using the geocast routing protocol so that relevant vehicles a significant distance away will receive the messages where one vehicle's direct transmission range is typically relatively short.

Vehicle-to-vehicle (V2V) and vehicle-to-infrastructure (V2X) applications require a minimum of one entity to send information to another entity. For example, many vehicle-to-vehicle safety applications can be executed on one vehicle by simply receiving broadcast messages from a neighboring vehicle. These messages are not directed to any specific vehicle, but are meant to be shared with a vehicle population to support the safety application. In these types of applications where collision avoidance is desirable, as two or more vehicles talk to each other and a collision becomes probable, the vehicle systems can warn the vehicle drivers, or possibly take evasive action for the driver, such as applying the brakes. Likewise, traffic control units can observe the broadcast of information and generate statistics on traffic flow through a given intersection or roadway.

SUMMARY OF THE INVENTION

In accordance with the teachings of the present invention, a system and method are disclosed for providing messages indicating potential hazardous road conditions using a wireless vehicle-to-vehicle communications network. Vehicles using the network include a plurality of sensors that are able to detect various potentially hazardous road conditions, such as rain, fog, icy road conditions, traffic congestion, etc. A plurality of vehicles that detect a specific road condition provide a confidence value that the condition exists. The confidence value is then aggregated by the vehicles with the confidence value of the detected condition from the other vehicles to provide an aggregated result that identifies the probability that the detected road condition is occurring using an appropriate distributed aggregation operator. The aggregated result is then transmitted to other vehicles approaching the road condition, possibly in a multi-hop manner. Alternately, the confidence value from all of the vehicles that detect the condition can be transmitted to approaching vehicles who will provide the aggregated result identifying the potential that the condition exists.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing information concerning potentially hazardous road conditions using a vehicle wireless communications system is merely exemplary in nature, and is in no way intended to limit the invention or its applications or uses.

The present invention proposes a road condition monitoring network where vehicles that are equipped with suitable sensors and a wireless communications system continuously monitor their surrounding environment using the sensors and wirelessly communicate this information to other vehicles using vehicle-to-vehicle communications. The potentially hazardous road conditions can be any road condition that is detectable by suitable detectors on the vehicle, such as fog, rain, snow, temperature, congestion, slippery roads, icy roads, pot holes, rough roads, dips, bumps, etc. As will be discussed, a number of vehicles detect the same hazardous road condition using their individual sensors and transmit signals as to whether the particular road hazard condition exists with a certain degree of confidence identifying the probability of how much the transmitting vehicle trusts its identification of the condition. The various reports from different vehicles are then aggregated to provide an aggregated probability that the road condition exists, which can then be transmitted to vehicles approaching the hazard. The aggregation operators could be naïve operators that employ minimum, maximum or averaging, or sophisticated operators that employ complicated algorithms, such as synopses diffusion logic, Dempster-Shaffer theory, FM sketch logic, etc.

A vehicle can broadcast location specific information packets from vehicle-to-vehicle (V2V) or vehicle-to-infrastructure-to-vehicle (V2I2V) using appropriate communications technology, such as DSRC, WiFi, etc. The communication and the information exchanged between vehicles can be either direct or can be multi-hop. With the use of WiMax, the coverage area may be extended a few miles. Multi-hop information dissemination is normally used for extending the reachability of messages. However, in situations where direct communication is used or preferred, multi-hop can also be employed in situations when there are obstructions that may affect the delivery of the advisory message. In these circumstances, multi-hop is primarily used to achieve increased reliability instead of extended range. On the other hand, longer range communications (e.g., WiMax) can be used in place of, or in conjunction with, V2V to extend the coverage area by a few miles. Hence, communications between vehicles far apart can be achieved without the need for an intermediate step, or leverage alternate technologies to facilitate information delivery.

Figure 1:
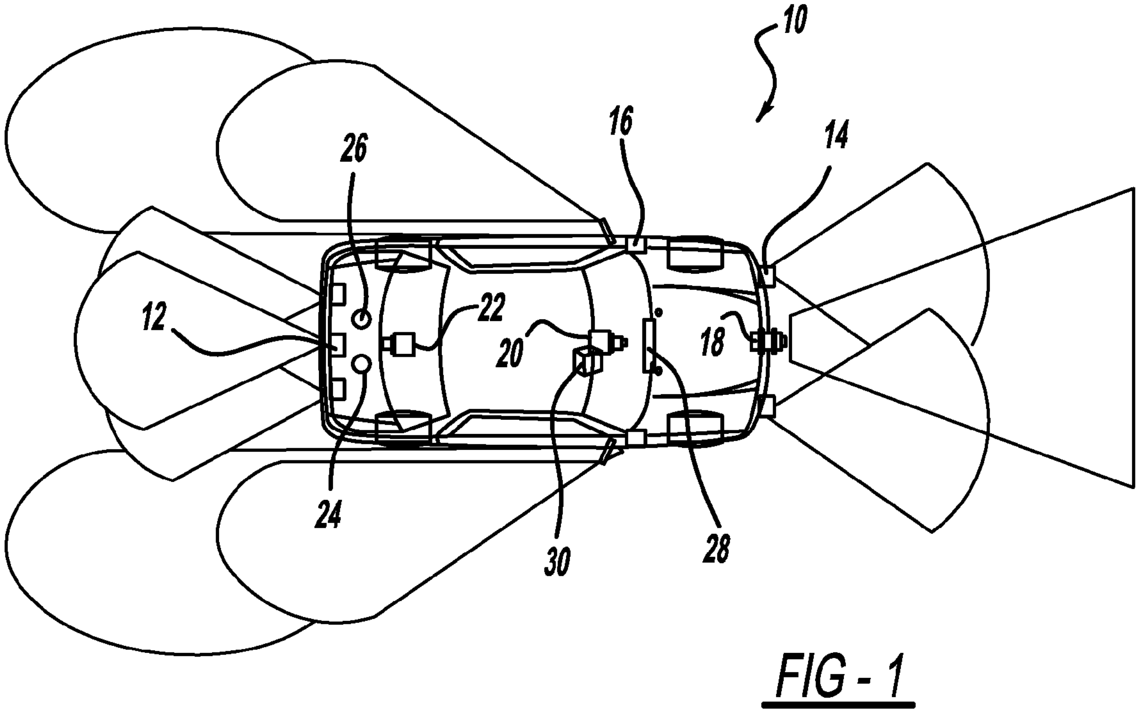
FIG. 1 is a plan view of a vehicle employing various vehicle sensors, cameras, detectors and communications systems.

FIG. 1 is a plan view of a vehicle 10 including various sensors, vision systems, controllers, communications systems, etc., one or more of which may be applicable for the wireless communications system discussed below. The vehicle 10 may include mid-range sensors 12, 14 and 16 at the back, front and sides, respectively, of the vehicle 10. A front vision system 20, such as a camera, provides images towards the front of the vehicle 10 and a rear vision system 22, such as a camera, provides images towards the rear of the vehicle 10. A GPS or a differential GPS system 24 provides location information, and a vehicle-to-vehicle (V2V) wireless communications system 26, such as a DSRC system, provides communications between the vehicle 10 and other structures, such as other vehicles, road-side systems, etc., as is well understood to those skilled in the art. The vehicle 10 also includes an enhanced digital map (EDMAP) 28 and an integration controller 30 that integrates the information from the various devices in the manner discussed below and provides 360° sensing data fusion. The EDMAP 28 could be used to aggregate data differently depending on the road type, geographic area (urban, rural) or at intersection or curve locations.

Figure 2:
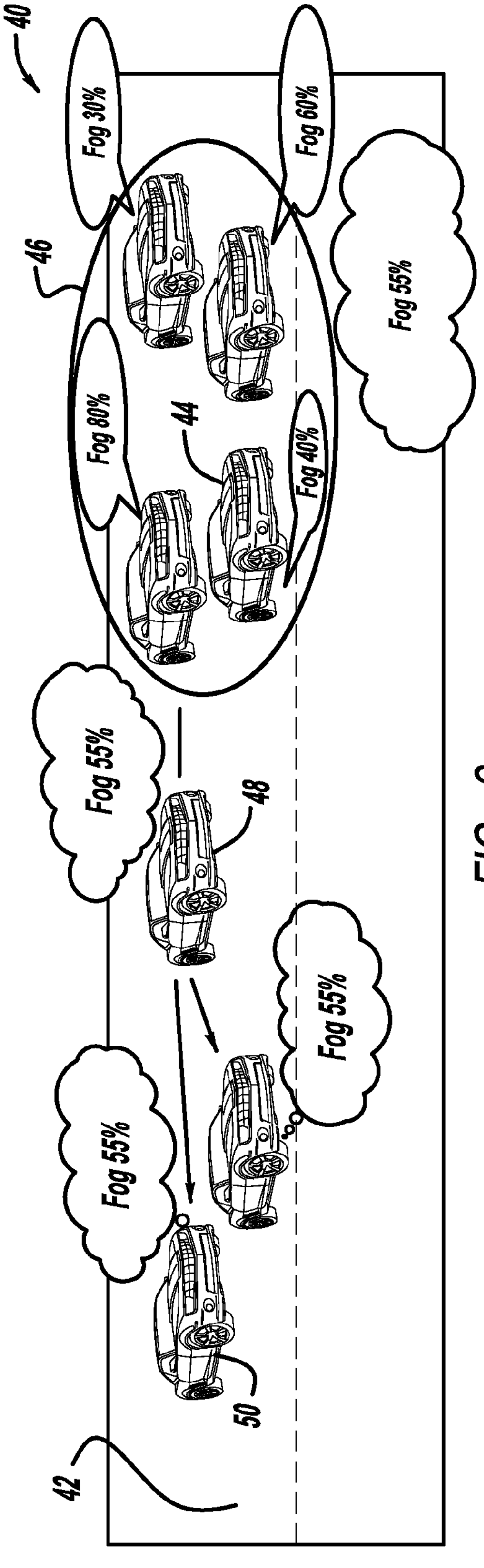
FIG. 2 is a representation of a group of vehicles traveling along a roadway where the group of vehicles is detecting a certain road condition with varying degrees of confidence, where the detected road condition is then aggregated and transmitted to other vehicles in a multi-hop message dissemination fashion.

FIG. 2 is a plan view of a roadway 40 including a plurality of travel lanes 42. Vehicles 44 traveling along the lanes 42 can be identified as being part of a vehicle cluster 46. Each of the vehicles 44 in the cluster 46 may be using their vehicle sensors to detect certain road conditions that potentially may be hazardous. For example, each of the vehicles 44 may be detecting that they are all presently in fog using a suitable vehicle sensor where each vehicle may detect that fog is occurring with a different level of confidence or probability. Each vehicle 44 in the cluster 46 then broadcasts that information to the other vehicles in the cluster 46, where each vehicle 44 now knows its confidence degree that fog exists and the other vehicle's confidence degree that the fog exists. Each vehicle 44 can then aggregate the several confidence values for the occurrence of fog and provide a distributed aggregation operator that is a more reliable indicator that the fog exists in that location in the roadway 40.

In the non-limiting example shown, one of the vehicles 44 in the cluster 46 is detecting fog with an 80% degree of confidence, another one of the vehicles 44 in the cluster 46 is detecting fog with a 30% degree of confidence, another one of the vehicles 44 in the cluster 46 is detecting fog with a 40% degree of confidence and another vehicle 44 in the cluster 46 is detecting fog with a 60% degree of confidence. Using an appropriate aggregation operator, these four degree of confidence values are then aggregated to provide a 55% confidence level that fog exists at that area in the roadway 40. The aggregation operators could be naïve operators that employ minimum, maximum or averaging, or sophisticated operators that employ complicated algorithms, such as synopses diffusion logic, Dempster-Shaffer theory, FM sketch logic, etc.

One or more of the vehicles 44 can then wirelessly transmit the aggregated results (or confidence degree) identifying the level of confidence that fog exists down the roadway 40 to other vehicles 48 that may be approaching the fog area as a warning of a potentially hazardous road condition, where vehicle safety devices on those vehicles can be prepared to take suitable action in the event that fog does occur. Further, the vehicle operator can be warned of the potential for the existing fog condition. In one embodiment, the vehicle operator is warned (or the information is communicated back to a traffic management center) if, and only if, the aggregated result is high enough, i.e., above some predetermined threshold, to provide the warning which otherwise may be an annoyance.

The receiving vehicles can set a threshold $cd_{threshold}$ which is used to evaluate whether the road hazard condition warning message can be trusted. If the confidence degree (cd) indicated message in the received message is greater than the threshold, the vehicle can display the road hazard condition and its location to the vehicle occupants. If the confidence degree in the received message is below the threshold, the received message will be filtered out and dropped. The vehicle may also filter the message if it is determined that the driver is already responding to the hazard, i.e., applying sufficient brake before the event location, predicted to change roads before the hazard or if it was determined that the hazard message was generated deliberately, i.e., power skidding or limit handling, or by time of day (e.g. during the day). Finally, the repeat warnings could be suppressed unless the confidence level substantially increased.

The message can be transmitted from the vehicles 44 in the cluster 46 as a geo-cast multi-hop message where it is transmitted from vehicle to vehicle. For the example shown in FIG. 2, the vehicle 48 receives the aggregated results identifying the probability of fog ahead, where the vehicle 48 then rebroadcasts the aggregated results to vehicles 50 farther down the roadway 40. The message will have both a spatio and temporal element to it where the message will only exist for a certain amount of time and within a specific geographic region. These parameters will be specific to the type of road condition detected and the type of system implemented.

In the embodiment discussed above, the vehicles 44 in the cluster 46 aggregated the percentage values representing the confidence degree from each vehicle and the distributed aggregate value was then transmitted to the approaching vehicle 48. In an alternate embodiment, the confidence value for each of the vehicles 44 in the cluster 46 can be transmitted as the message to the approaching vehicles 48 and 50 and each approaching vehicles 48 and 50 can use its aggregation operator for determining the aggregated results.

Figure 3:
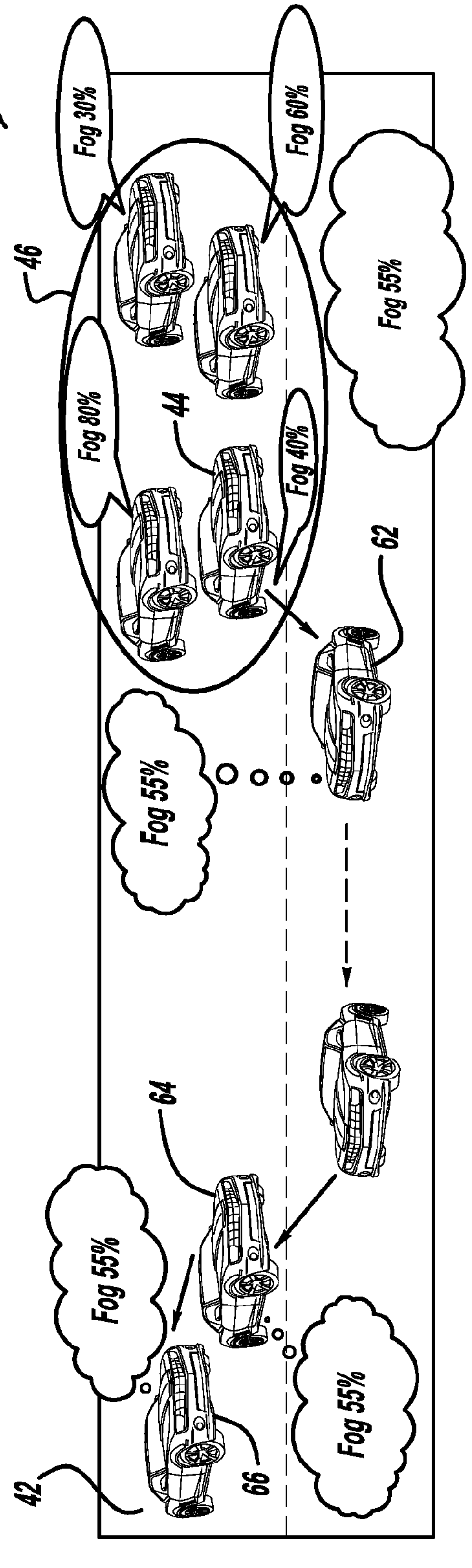
FIG. 3 is a representation of a group of vehicles traveling along a roadway, where each of the vehicles are detecting a certain road condition with verifying degrees confidence, where the detected road condition is then aggregated and transmitted to other vehicles by vehicles traveling in the opposite direction.

In an alternate embodiment, the message is delivered to the approaching vehicles by vehicles traveling in an opposite direction. This embodiment is illustrated in FIG. 3, where like elements are identified by the same reference numeral. Particularly, the aggregated results from the vehicles 44 in the cluster 46 is transmitted to vehicles 62 traveling in an opposite lane who will then relay the messages to an approaching vehicle 64 in the lane. As above, the vehicle 64 can retransmit the aggregated results to other vehicles, such as vehicle 66 approaching from behind.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting potentially hazardous road conditions, said method comprising:

detecting a road condition by sensors on a plurality of vehicles around the road condition where each vehicle detecting the road condition assigns the detected road condition a confidence value;

transmitting the confidence value of the road condition from each vehicle that detects the road condition to other vehicles around the road condition;

aggregating the confidence values in one or more of the plurality of vehicles to generate an aggregated result that identifies the probability that the road condition is occurring; and wirelessly transmitting the aggregated result to vehicles approaching the road condition.

2. The method according to claim 1 wherein transmitting the aggregated result includes transmitting the aggregated result from vehicle to vehicle in a multi-hop manner.

3. The method according to claim 1 wherein transmitting the aggregated result includes transmitting the aggregated result for a predetermined period of time and a predetermined distance.

4. The method according to claim 1 wherein generating the aggregated result includes generating an average of the confidence values or applying simple forms of distributed aggregation operators such as minimum or maximum.

5. The method according to claim 1 wherein generating the aggregated result includes using a sophisticated operator.

6. The method according to claim 5 wherein the sophisticated operator is selected from the group consisting of synopses diffusion logic, Dempster-Shaffer theory and FM sketch logic.

7. The method according to claim 1 wherein the road condition is one or more of fog, rain, sleet, ice, slippery road, pot holes, traffic congestion, bumps, dips and rough roads.

8. The method according to claim 1 wherein transmitting the aggregated result includes transmitting the aggregated result to vehicles traveling in an opposite direction as a relay to store and carry the aggregated result of hazardous road conditions.

9. The method according to claim 1 further comprising causing the vehicle that receives the aggregated result to act on the road condition if the aggregated result exceeds a predetermined threshold.

10. The method according to claim 1 wherein aggregating the confidence values includes aggregating the confidence values to generate the aggregated result in a vehicle that does not detect the road condition.

11. A method for detecting potentially hazardous road conditions, said method comprising:

detecting a road condition by sensors on a plurality of vehicles around the road condition where each vehicle detecting the road condition assigns the detected road condition a confidence value;

transmitting the confidence value of the road condition from each vehicle that detects the road condition to other vehicles;

aggregating the confidence value in one or more vehicles to generate an aggregated result that identifies the probability that the road condition is occurring; and causing a vehicle to act on the road condition if the aggregated result exceeds a predetermined threshold.

12. The method according to claim 11 further comprising wirelessly transmitting the aggregated result to vehicles approaching the road condition.

13. The method according to claim 12 wherein transmitting the aggregated result includes transmitting the aggregated result from vehicle to vehicle in a multi-hop manner.

14. The method according to claim 12 wherein transmitting the aggregated result includes transmitting the aggregated result for a predetermined period of time and a predetermined distance.

15. The method according to claim 12 wherein transmitting the aggregated result includes transmitting the aggregated result to vehicles traveling in an opposite direction as a relay to store and carry the aggregated result of hazardous road conditions.

16. The method according to claim 11 wherein generating the aggregated result includes using a sophisticated operator selected from the group consisting of synopses diffusion logic, Dempster-Shaffer theory and FM sketch logic.

17. The method according to claim 11 wherein the road condition is one or more of fog, rain, sleet, ice, slippery road, pot holes, traffic congestion, bumps, dips and rough roads.

18. A system for detecting potentially hazardous road conditions, said system comprising:

means for detecting a road condition by sensors on a plurality of vehicles around the road condition for each vehicle detecting the road condition assigns the detected road condition a confidence value;

means for transmitting the confidence value of the road condition from each vehicle that detects the road condition to other vehicles;

means for aggregating the confidence value in one or more of the plurality of vehicles to generate an aggregated result that identifies the probability that the road condition is occurring; and means for wirelessly transmitting the aggregated result in a multi-hop manner to vehicles approaching the road condition.

19. The system according to claim 18 further comprising means for causing the vehicle that receives the aggregated result to act on the road condition if the aggregated result exceeds a predetermined threshold.

20. The system according to claim 18 wherein the means for transmitting the aggregated result transmits the aggregated result to vehicles traveling in an opposite direction as a relay to store and carry the aggregated result of hazardous road conditions.

* * * * *